United States Patent [19]
Arnold et al.

[11] Patent Number: 5,821,297
[45] Date of Patent: Oct. 13, 1998

[54] LAMINATING ADHESIVE

[75] Inventors: Christian W. Arnold, Auburn Hills, Mich.; Werner H. Pimpl, München, Germany

[73] Assignee: H. B. Fuller Licensing & Financing, Inc., Arden Hills, Minn.

[21] Appl. No.: 525,542

[22] PCT Filed: Mar. 18, 1994

[86] PCT No.: PCT/EP94/00860

§ 371 Date: Oct. 19, 1995

§ 102(e) Date: Oct. 19, 1995

[87] PCT Pub. No.: WO94/21743

PCT Pub. Date: Sep. 29, 1994

[30] Foreign Application Priority Data

Mar. 18, 1993 [DE] Germany ............ G 93 04 018.0

[51] Int. Cl.⁶ .................. C08J 3/00; C08K 3/20; C08L 75/00
[52] U.S. Cl. .............. 524/591; 524/501; 524/507; 524/515; 524/521; 524/522; 524/523; 524/839; 524/840; 524/296; 524/297; 524/563; 525/123; 525/125; 525/440; 525/455
[58] Field of Search ............................ 524/507, 591, 524/839, 840, 296, 297, 524, 563, 501, 515, 521, 522, 523; 525/123, 125, 440, 455

[56] References Cited

U.S. PATENT DOCUMENTS

| 4,126,144 | 11/1978 | Duarte | 132/73 |
| 4,396,039 | 8/1983 | Klenk et al. | 138/118.1 |
| 4,448,843 | 5/1984 | Yamada et al. | 428/336 |
| 4,745,028 | 5/1988 | Das et al. | 428/391 |
| 5,198,501 | 3/1993 | Bott et al. | 525/266 |
| 5,279,659 | 1/1994 | Nishiura et al. | 106/177 |
| 5,326,808 | 7/1994 | Floyd et al. | 524/457 |
| 5,331,039 | 7/1994 | Blum et al. | 524/839 |

OTHER PUBLICATIONS

Odian. G., Principles of Polymerization, 1981, pp. 20–25 and 279–281.

*Primary Examiner*—Patrick Niland

[57] ABSTRACT

The invention refers to an aqueous dispersion for the production of an at least two-component polyurethane-modified dispersion adhesive especially suited for the lamination of fabrics, foil and such materials onto carrier materials. The dispersion contains at least one hydroxyl-group containing polymer compound to react with a dispersible hardener to be added to the dispersion, the hardener itself containing a di- or polyfunctional isocyanate compound. The dispersion contains either a (co) polymer compound derived of ethylene vinylacetate (EVA) in addition to a (co)polymer compound derived of (meth) acrylic acid (derivative) or one of these two (co)polymer compounds besides one plasticizer.

10 Claims, No Drawings

LAMINATING ADHESIVE

For laminating carrier substrates with textiles, films and other flexible plane, i.e. flat materials, two-component adhesives based on non-aqueous solvents have been in use for a long time. Aqueous dispersion adhesives, however, are also well known for a very long time, which serve to replace such solvent-based adhesives. In the automotive industry in the production of dashboards and other interior parts, for example, PVC films are laminated onto absorbent carriers like e.g. particle boards with such aqueous two-component dispersions. Polyurethane-modified dispersion are most frequently used as they are especially heat-resistant. In these adhesives an aqueous dispersion, containing at least one hydroxyl group containing polymer compound and besides color and other additives is mixed with a hardener that is dispersible in water, comprising a di- or polyfunctional isocyanate. The dispersion is then applied to the substrate to be bonded (most commonly sprayed on) and after evaporating, reactivated by heat which allows bonding to the other substrate of the laminated part by simple pressing.

The dispersion does not always have to contain two components and can of course contain several hydroxyl containing polymer compounds beside each other.

It is already known, to change polyurethane dispersions by adding other polymers to become dispersions, as the polyurethane component is fairly expensive and pure polyurethane dispersions are difficult to be applied by spraying. Sprayability can be improved by adding ethylene vinylacetate (EVA) copolymers to the dispersion. Heat resistance of the bondings however decreases significantly. It is also common knowledge to add acrylates to the polyurethane dispersion. This, however causes problems when bonding material with a high plasticizer content like e.g. PVC films frequently used in the automotive and furniture industry, as the plasticizer compounds tend to creep from the substrate into the bonding seam, which significantly reduces the bonding strength of the bonding seam.

The required features and characteristics of all such adhesives is the suitability for application by spraying, low reactivation temperatures, long potlife and after curing, high heat resistance and resistance against plasticizers contained in the substrate.

None of the afore mentioned, well-known adhesives completely fulfills all these requirements.

A disadvantage of the common two-component polyurethane-modified dispersion is that they do not totally feature the characteristics of the solvent-based two-component polyurethane adhesives they were designed to replace. Especially initial tack and heat resistance of the bondings as well as potlife of the dispersions after having added the hardener are significantly worse than those of products based on non-aqueous solvents. Particularly disadvantageous in industrial multiple shift operation is the extremely short potlife leading to frequent interruptions of the production cycle due to necessary cleaning work.

Considering this background, it is the basic task of this invention to create improved laminating dispersions featuring improved long-time heat resistance and longer potlives so that uninterrupted work is at least possible in two-shift operation.

Basic task of this invention is to specify improved laminating dispersions featuring low percentage of polyurethane and allow a resulting saving of costs without having to do without the advantages of common polyurethane-modified dispersions.

Another main task of the invention is the creation of improved laminating dispersions which feature higher resistance against the plasticizer components in the substrate It was found, surprisingly enough, that the resistance of bondings made with dispersions of the previously mentioned kind against plasticizer components from the substrate can be improved by adding plasticizer to the dispersion before starting the bonding process. This surprising result is achieved not only for polyurethane-modified two-or multiple-component dispersions but also for dispersions based on EVA copolymers and acrylate, without polyurethane contents.

Another surprising discovery was the fact that polyurethane-modified two-or multiple component dispersion feature a significantly longer potlife if they contain EVA copolymer and polyacrylate beside each other, not as before alternatively.

It proves to be a particular advantage if polyurethane-modified two-or multiple-component dispersions contain at least one EVA copolymer and also at least one polyacrylate and in addition a plasticizer. Such dispersion feature extremely improved long-time heat resistance, significantly longer potlife, high initial tack and high final strength in comparison to common polyurethane/acrylate dispersions without plasticizer and EVA copolymer. Bondings done with dispersions as stated in this invention are just as resistant against plasticizer from the substrate as common two-component adhesives based on non-aqueous solvents and feature a much higher resistance against plasticizers as common aqueous two-component dispersion adhesives. Even in the climatic test the dispersions as described in this invention are superior to conventional polyurethane/acrylate dispersion adhesives.

The dispersions as described in this invention can be produced by means of commonly available products. "DISPARCOLL", a product of the BAYER AG, can be used as the polyurethane component of the dispersion. "WINAPAS" by Wacker or "WINNAMUL", also from Wacker, can be employed as the EVA component. Suitable hydroxyl-groups containing acrylate dispersions are available from the Vereinigte Ürdinger Ölwerke Alberding & Co. The Firms Monsanto offers ester group containing products, especially butyl and benzyl phthalate which are particularly suitable as plasticizer component.

The Desmodur (trademark) products from Bayer AG can be used as the isocyanate component (hardener).

To obtain an optimum workability, it is recommended to set up the EVA component of different products which result in the required strength properties and at the same time good sprayability.

The polyacrylate components in the dispersions according to this invention can completely or partially be replaced by common surrogates like methacrylate polymers and copolymers,(meth)acrylic acid polymers and copolymers and hydroxyl group containing polyacrylonitriles, for instance (partially) hydrolyzed polyacrylonitrile.

The polyurethane content of the dispersion as described in this invention in general lies between 0% to 30%, preferably between 5% and 25% and optimally between 15% and 20%.

If contained in the dispersion as described in the invention, the EVA component in the dispersion may be up to 85%, preferably between 40% and 60% and optimally between 65% and 75%.

The content of polyacrylate or the above mentioned surrogates in the dispersion in general lies between 0% and 40%, preferably between 5% and 30% and optimally between 5% and 10%.

The plasticizer content in the dispersion lies between 0% and 20%, preferably between 5% and 15% and optimally between 5% and 10% .

In the following there are some practical examples of the invention, i.e. for the optimum variant, where the dispersion contains EVA copolymers, polyacrylate and ester group containing plasticizers besides polyurethane.

Examples 1 and 2 are dispersions according to this invention, example 3 (comparison example) is a typical, state-of-the-art polyurethane-modified two-component dispersion with polyacrylate component.

Example 1:

| | |
|---|---|
| Polyurethane dispersion | 17.5% |
| EVA dispersions | 69.0% |
| Acrylate dispersions | 7.5% |
| Plasticizer | 5.0% |
| Stabilizers, color and additional agents | 1.0% |
| Solid Content | 58% |
| Viscosity Brookfield HBT | 2.200 mPa * s |

Example 2:

| | |
|---|---|
| Polyurethane dispersion | 9.0% |
| EVA dispersion | 64.6% |
| Acrylate dispersion | 21.0% |
| Plasticizer | 5.0% |
| Stabilizers, color and additional agents | 0.4% |
| Solid content | xx% |
| Viscosity Brookfield HBT | 2.780 mPa * s |

Example 3:

| | |
|---|---|
| Polyurethane dispersion | 59.5% |
| Acrylate dispersions | 40.07% |
| Stabilizers, color and additional agents | 0.43% |
| Solid content | 45.2% |
| Viscosity Brookfield HBT | 1.400 mPa * s |

The dispersions of example 1 and 3 were now mixed with hardener (Desmodur) in a ratio of 100 parts of dispersion to 6 parts hardener.

Now the change in viscosity of the compound was measured to be able to estimate potlife. Potlife can be regarded as exceeded as soon as the viscosity change exceeded the initial value by 100% and if a bonding in the 180° peel test (tensile peel test) resulted in a value of less than 3 N/3 cm at the determination of final strength.

Initial tack, final bonding strength and long-time heat resistance were determined by applying the adhesives mixed as described by means of a doctor blade onto one side of the substrate with the dimensions of 15×3 cm and a coverage of 60μ.

For the determination of the initial tack, the substrate coated as described above and after a exhaust time of 30 minutes was pressed together with a laminating foil at room temperature and the foil tested 10 seconds after pressing by means of the 180 °peel test.

For determination of final strength, the substrate was again pressed together with the laminating foil after a exhaust time of 30 minutes at room temperature and the bonding was tested by means of 90 ° peel test after 24 hours after pressing.

For determining longtime heat resistance, the substrate, after 30 minutes of exhaust time, was pressed together with the laminating foil after 30 minutes of exhaust time. Curing took place at room temperature. The bonding was then tested by means of a static tensile test in the warming cabinet at 90° C. with 100 g and an angle of 90°(90°peel test). Peel length (peeling length) was determined after 2 weeks in mm.

In all strength tests common conditions concerning pressure, temperature and pressing time were applied. The substrate was also a commonly available carrier material.

The result are specified in the following table:

| | Example 1 | Example 2 | Example 3 |
|---|---|---|---|
| Long-time heat resistnace | 22 d<br>8 mm | 5 d<br>100 mm | <24 h<br>100 mm |
| Change in viscosity | 12 h<br>15% | 10 h<br>18.5% | 8 h<br>100% |
| Initial Tack | 12 N/3 cm | 10 N/3 cm | 8 N/3 cm |
| Final strength | 60 N/3 cm | 40 N/3 cm | 60 N/3 cm |

It proved that the dispersions according to this invention (Examples 1 and 2) feature a much improved long-time heat resistance and an increased potlife, and even initial tack is better than that of the common dispersions as shown in example 3. The dispersion according to this invention of example 1 has the same final strength as the dispersion in example 3, the dispersion of example 2 a slightly lower one than example 3.

We claim:

1. An at least two-component aqueous polyurethane-modified dispersion adhesive, suitable for the lamination of textiles, foils and the like onto substrates,the adhesive comprising a first component comprising a dispersion of at least one hydroxyl-group containing polymer compound, and a second component comprising a dispersible hardener to be added to the dispersion, the hardener comprising a di-or polyfunctional isocyanate compound, wherein the adhesive contains a dispersion comprising at least two different ethylene vinyl acetate copolymers and further contains a plasticizer.

2. An at least two-component aqueous polyurethane-modified dispersion adhesive, suitable for the lamination of textiles, foils and the like onto substrates, the adhesive comprising a first component comprising a dispersion of at least one hydroxl-group containing polymer compound, and a second component comprising a dispersible hardener to be added to the dispersion, the hardener comprising a di-or polyfunctional isocyanate compound, wherein the adhesive contains 5–25% of a polyurethane dispersion;

40–80% of said adhesive of a copolymer of ethylene and vinyl acetate;

5–30% of said adhesive of a member of the group consisting of a polymer or copolymer of (meth) acrylic acid, a (meth)acrylate polymer or copolymer, a hydroxyl-group containing polyacrylonitrile, and mixtures thereof; and 5–15% of said adhesive of a plasticizer.

3. A dispersion adhesive as in claim 2, wherein the adhesive contains

5–20% of said polyurethane dispersion;

65–75% of said adhesive of said copolymer of ethylene and vinyl acetate;

5–10% of said adhesive of said member of the group consisting of a polymer or copolymer of (meth)acrylic acid, a (meth) acrylate polymer or copolymer, a hydroxyl-group containing polyacrylonitrile, and mixtures thereof; and 5–10% of said adhesive of said adhesive plasticizer.

4. An aqueous dispersion adhesive, suited for the lamination of fabrics, foils and other such material onto a substrate, comprising:

a) at least one copolymer of ethylene and vinyl acetate;

b) at least one member of the group consisting of (meth) crylic acid polymers and copolymers, (meth) acrylate polymers and copolymers and hydroxyl-group containing polyacrylonitriles;

c) a phthalate plasticizer; and e) a polyester urethane.

5. A dispersion adhesive as in claim 4 wherein the polyester urethane is a reaction product of at least one aliphatic isocyanate compound.

6. A dispersion adhesive as in claim 4, which comprises at least one of a polymer or copolymer of a (meth)acrylate ester or a hydroxyl-group containing polyacrylonitrile.

7. A dispersion adhesive as in claim 4 wherein the adhesive contains

30–85% of said adhesive of said copolymer of ethylene and vinyl acetate;

5–40% of said adhesive of said at least one member of the group consisting of (meth)acrylic acid polymers and copolymers, (meth)acrylate polymers and copolymers and hydroxyl-group containing polyacrylonitriles; and 5–20% of said adhesive of said plasticizer.

8. An aqueous dispersion adhesive, suited for the lamination of fabrics, foils and other such material onto a substrate, comprising:

15–20% of said adhesive of polyurethane dispersion;

65–75% of said adhesive of a copolymer of ethylene and vinyl acetate;

5–10% of said adhesive of a member of the group consisting of (meth)acrylic acid polymers and copolymers, (meth)acrylate polymers and copolymers, hydroxyl-group containing polyacrylonitriles and mixtures thereof; and 5–10% of said adhesive of a phthalate plasticizer.

9. An aqueous dispersion adhesive, suited for the lamination of fabrics, foils and similar such materials onto substrates, the adhesive comprising:

a) at least one hydroxyl-group containing polymer compound in a first component thereof; and b) a hardener containing a di- or polyfunctional isocyanate compound in a second component thereof;

wherein the adhesive contains at least one copolymer of ethylene and vinyl acetate;

at least one member of the group consisting of (meth) acrylic acid polymers and copolymers, (meth)acrylate polymers and copolymers, and hydroxyl-group containing polyacrylonitriles; and a plasticizer.

10. A dispersion adhesive as in claim 9 which further comprises a polyester urethane and in which the plasticizer is a phthalate ester plasticizer.

* * * * *

UNITED STATES PATENT AND TRADEMARK OFFICE
CERTIFICATE OF CORRECTION

PATENT NO. : 5,821,297

DATED : October 13, 1998

INVENTOR(S) : Christian W. Arnold; Werner H. Pimpl

It is certified that error appears in the above-identified patent and that said Letters Patent is hereby corrected as shown below:

Column 1, line 2, insert --The invention relates to aqueous dispersion adhesives.--.

Signed and Sealed this

Twentieth Day of July, 1999

Attest:

Q. TODD DICKINSON

*Attesting Officer*     *Acting Commissioner of Patents and Trademarks*